T. H. CLOKE & L. J. SHEARER.
RAKE CLEANER.
APPLICATION FILED SEPT. 2, 1913.
1,107,035.
Patented Aug. 11, 1914.
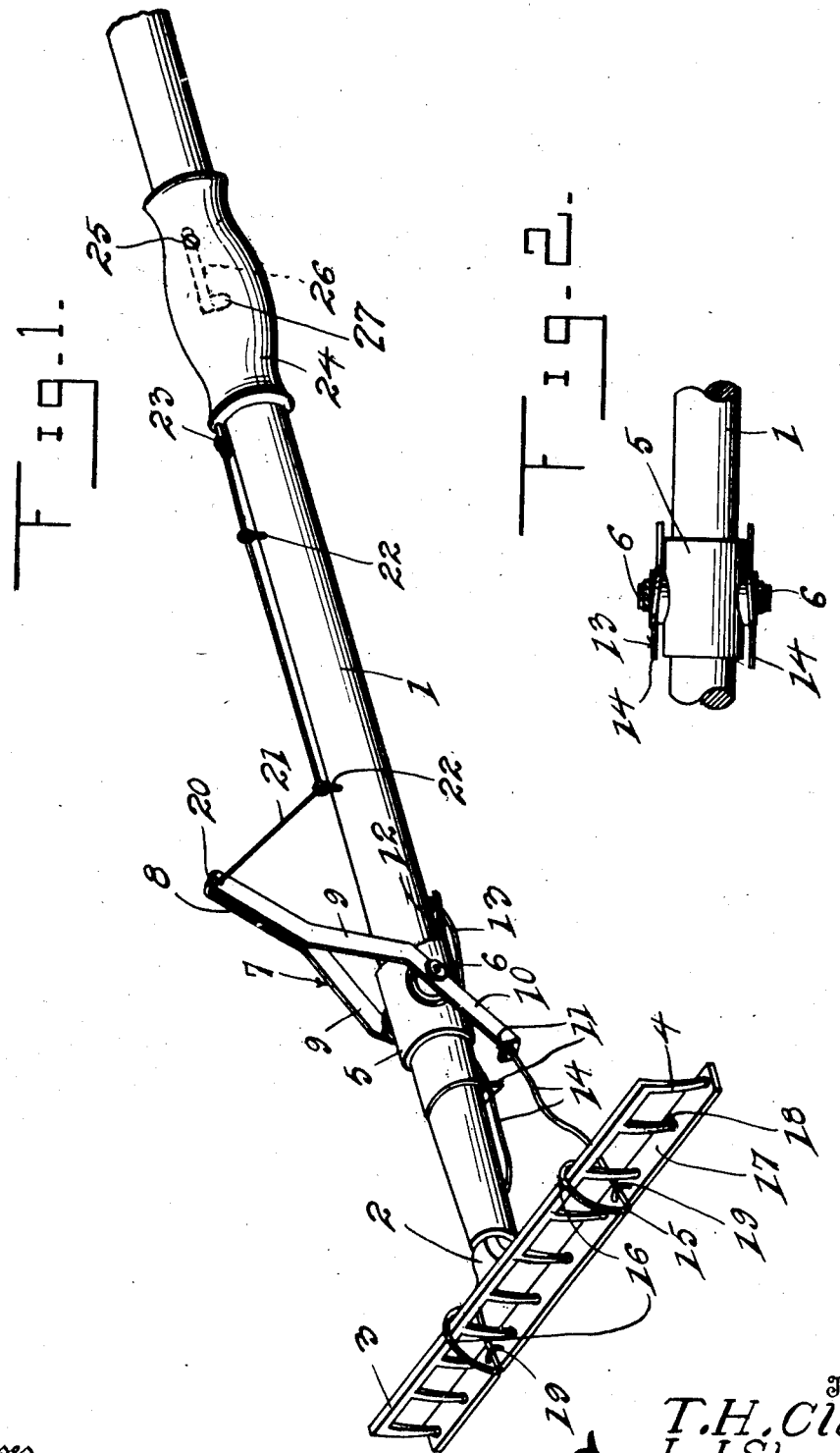

UNITED STATES PATENT OFFICE.

THOMAS HENRY CLOKE AND LESLIE JOHN SHEARER, OF CHICAGO, ILLINOIS.

RAKE-CLEANER.

1,107,035.

Specification of Letters Patent.    Patented Aug. 11, 1914.

Application filed September 2, 1913. Serial No. 787,781.

*To all whom it may concern:*

Be it known that we, THOMAS H. CLOKE and LESLIE J. SHEARER, citizens of the United States, residing at Chicago, in the county of Cook and State of Illinois, have invented certain new and useful Improvements in Rake-Cleaners; and we do hereby declare the following to be a full, clear, and exact description of the invention, such as will enable others skilled in the art to which it appertains to make and use the same.

This invention relates to new and useful improvements in rake cleaners and has for its object the provision of a device of the above character which may be easily and quickly applied to the ordinary type of rake without materially changing the construction of the same.

Another object of our invention is the provision of a device which will strip the rake teeth of any litter which may have gathered thereon without necessitating the operator changing his position.

A further object of our invention is the provision of such a device which will automatically clean the teeth of the ordinary type of rake by simply releasing the handle portion which is within easy reach of the operator.

With the above and other objects in view we now proceed to describe our invention in the following specification and accompanying drawings, in which, Figure 1 is a detail perspective view of our improved rake cleaner showing the same as it would appear when applied to a rake, and Fig. 2 is an enlarged detail view of the means by which the cleaning device is held in position on the rake handle.

Referring to the drawings by characters of reference 1 indicates the usual handle portion of an ordinary rake having secured thereto and at the lower extremity thereof the rake head 2 which preferably comprises the T-shaped member having the outwardly extending arms 3 which carry the rake teeth 4. These rake teeth are preferably segmental in contour.

Our improved cleaning device, which is used in connection with the rake above described, preferably comprises a suitable sleeve 5 having formed integrally therewith the outwardly extending lugs 6 which are adapted to act as a pivot for the bifurcated lever 7. This bifurcated lever is preferably formed of a single strip of material which is bent as shown to form the U-shaped member 8 which terminates at its lower extremity in the bifurcated arms 9. These bifurcated arms preferably extend downwardly for a short distance and their lower extremities are bent to form the parallel arms 10 which in turn are bent as shown at 11 and are adapted to act as a means to secure the spring which will be more fully hereinafter described.

A rearwardly extending projection 12 is formed integrally with the sleeve 5 and extends parallel with the handle for a short distance, the use of this projection will be more fully hereinafter described.

Secured to the projection above mentioned we preferably provide the bifurcated spring 13 which lies between the rear extremity of this projection and the handle, as will be clearly seen upon referring to Fig. 1. The arms of this spring 13 are extended as shown and are coiled around the lugs 6. The extensions 14 which are formed integrally with the arms of the spring 13 are a continuation of the coils and extend downwardly as clearly shown in the drawings to the point 15 from which they are again bent upwardly and rearwardly to form the hooks 16 which act as a stop to prevent the stripping bar, which will be more fully hereinafter described, from passing beyond the lower extremities of the rake teeth.

The stripping bar above mentioned preferably comprises a strip of metal or other suitable material, indicated by the numeral 17, which is provided with apertures 18 and has intermediate its ends the loops 19 which are adapted to overlie the portions of the spring intermediate the coil portions and the bent portion 15.

The upper end of the U-shaped member 8 is preferably provided with an aperture 20, which is adapted to receive the end of the flexible connection 21 which extends through the screw eyes 22 in the rake handle back to a suitable loop connection 23, carried by a sleeve 24. This sleeve 24 is slidably mounted on the handle of the rake and has intermediate its ends the inwardly projecting screw 25. This screw 25 is so arranged that it is slidable in the groove 26, having at its upper extremity the angular extension 27 in which the screw 25 is adapted to seat when the rake is being used.

It will be clearly seen from the foregoing that when it is desired to make use of our improved invention the rake is used in the ordinary manner and should the teeth become clogged with undesirable material the only operation necessary is a slight revolution of the sleeve 24 with relation to the handle which will permit said sleeve to slide forwardly and in that way allow the stripping bar 17 to descend with relation to the rake teeth and cause any trash or other litter which may have gathered thereon to be forced downwardly and off the rake teeth. After the trash has been removed the operator slides the sleeve 24 rearwardly which by means of the cord or flexible connection 21 lowers the U-shaped member 8 and raises the stripping bar to its normal position, at which time the sleeve 24 is again turned so that the screw 25 rests in the angular extension 27 of the groove 26. Thus, it will be seen that the stripping bar will again be in position for use and the process of raking may continue without any interference thereby.

While in the foregoing we have shown and described the preferred embodiment of our invention we wish it to be understood that we may change the specific arrangement, and combination of parts, without in any way departing from the spirit and scope of our invention as defined in the appended claims.

What is claimed is:—

In combination with a rake, a sleeve secured to the handle of the rake adjacent its lower extremity, lugs extending outwardly from said sleeve, at diametrically opposite points, a lever pivotally mounted on the lugs, an extension at the rear extremity of the sleeve, said extension partly overlying the rake handle, a bifurcated spring, the arms of said spring being coiled around the lugs and extending parallel with the arms of the lever, a U-shaped member formed integral with the springs, said U-shaped member being adapted to lie beneath the extension on the sleeve, a stripping bar slidably mounted with relation to the rake teeth, extensions formed integrally with the spring and connected to the stripping bar and adapted to exert downward pressure thereagainst to normally hold the stripping bar at the ends of the rake teeth, a sleeve slidably mounted with relation to the rake handle, and a flexible connection secured to the sleeve and the lever and adapted to be operated when the sleeve is moved.

In testimony whereof we affix our signatures in presence of two witnesses.

THOMAS HENRY CLOKE.
LESLIE JOHN SHEARER.

Witnesses:
  DELBERT HOCH,
  EDWIN HOCH.